US008661020B2

(12) United States Patent
Sullivan et al.

(10) Patent No.: US 8,661,020 B2
(45) Date of Patent: Feb. 25, 2014

(54) SYSTEM, METHOD AND COMPUTER PROGRAM PRODUCT FOR DECODING VEHICLE IDENTIFICATION NUMBERS

(75) Inventors: Thomas J. Sullivan, Santa Monica, CA (US); Michael Swinson, Santa Monica, CA (US)

(73) Assignee: Truecar Inc., Santa Monica, CA (US)

( * ) Notice: Subject to any disclaimer, the term of this patent is extended or adjusted under 35 U.S.C. 154(b) by 77 days.

(21) Appl. No.: 13/360,981

(22) Filed: Jan. 30, 2012

(65) Prior Publication Data
US 2013/0198167 A1   Aug. 1, 2013

(51) Int. Cl.
*G06F 17/30* (2006.01)
(52) U.S. Cl.
USPC .................. 707/715; 707/899; 701/29.6
(58) Field of Classification Search
USPC ..................... 707/715, 899; 701/29.6
See application file for complete search history.

(56) References Cited

U.S. PATENT DOCUMENTS 6,438,481 B1 *   8/2002   Carpenter et al. ............... 701/70
2012/0041968 A1 *   2/2012   Zak et al. ...................... 707/769

* cited by examiner

*Primary Examiner* — Hung Q Pham
(74) *Attorney, Agent, or Firm* — Sprinkle IP Law Group (57) ABSTRACT

A vehicle identification number (VIN) decoder (VDC) implementing a unique VIN decoding method may, for a given VIN, shorten the VIN and form a stem and a leaf therefrom. Utilizing the stem, the VDC may operate to find matching leaf values, if any, from a set of look up tables. Depending upon a match outcome, one or more trim identification code (TIC) values can be assigned to the VIN and a candidate list can be constructed utilizing the assigned TIC value(s). The candidate list, which can be optimized, may contain one or more candidate trims for the VIN. For each candidate trim, a confidence score and match probability can be generated. The VDC may provide decoded information containing trim data associated with at least one of the one or more candidate trims for the VIN to a client device over a network connection.

20 Claims, 4 Drawing Sheets

SYSTEM, METHOD AND COMPUTER PROGRAM PRODUCT FOR DECODING VEHICLE IDENTIFICATION NUMBERS

TECHNICAL FIELD

This disclosure relates generally to decoders. More particularly, embodiments disclosed herein relate to a system, method, and computer program product for decoding vehicle identification numbers.

BACKGROUND OF THE RELATED ART

A vehicle identification number (VIN) is a serial number used by automotive manufacturers to uniquely identify vehicles that they have manufactured. Before 1981, different formats of VINs were used in the United States. In 1981, the U.S. National Highway Traffic Safety Administration (NHTSA) standardized the VIN to a seventeen-character format, representing a distinct year, make, model, and body type of a vehicle manufactured for sale in the United States. Europe and many parts of the world implement standards issued by the International Organization for Standardization.

A VIN can be useful in verifying the true identity of a vehicle. For example, since a VIN contains information on a distinct year, make, model, and body type of a particular vehicle, it is possible for a potential car buyer to deconstruct the information embedded in a VIN of a particular vehicle listed in an ad for sale and verify whether the year, make, model, and body type of the vehicle is consistent with the information provided in the ad. In some cases, however, a more detailed description of the vehicle may be desired.

SUMMARY OF THE INVENTION

Example embodiments relate to an identification number decoding system, method, and computer program product for decoding identification numbers in a reliable and comprehensive manner. One embodiment of an identification number decoding method may include receiving an identification number at the identification number decoding system. The method may include determining if the received identification number is valid. In one embodiment, the method may comprise generating a notification if the received identification number is not valid.

In one example embodiment, the received identification number can be a vehicle identification number (VIN). In one embodiment, the VIN may conform to a seventeen-character format. The VIN may conform to any standardized format recognized in the art. In one embodiment, the determination as to whether a VIN is valid can be made by examining a check digit in the VIN.

In one embodiment, the method may comprise shortening the VIN into a sVIN. In one embodiment, the sVIN may be a subset of characters from the VIN without the check digit. In one embodiment, the method may further comprise partitioning the sVIN into a sVIN stem and a sVIN leaf; finding one or more matching sVIN leaf values from a set of lookup tables utilizing the sVIN stem; assigning one or more trim identification code (TIC) values to the VIN depending upon a match outcome; and constructing a candidate list utilizing the one or more TIC values, the candidate list containing one or more candidate trims for the VIN. In one embodiment, the candidate list may be optimized by removing non-matches.

In one embodiment, the method may further comprise generating a confidence score and match probability for each of the one or more candidate trims; and based on the confidence score and match probability, providing decoded information for the VIN to a second computer communicatively connected to the first computer over a network connection, the decoded information including trim data associated with at least one of the one or more candidate trims.

The match outcome may comprise a single matching sVIN leaf value. If this is the case, in one embodiment, a VIN decoder module, application, or control logic (referred to herein as VDC) implementing the method may operate to perform a first set of functions, including assigning every distinct TIC value in a first lookup table that share the sVIN stem to the VIN if the single matching sVIN leaf value does not fall between an expected minimum sVIN leaf value and an expected maximum sVIN leaf value; and assigning a TIC value associated with the sVIN leaf to the VIN if the single matching sVIN leaf value falls between the expected minimum sVIN leaf value and the expected maximum sVIN leaf value.

The VDC may further categorize the match outcome. For example, if the single matching sVIN leaf value falls between the expected minimum sVIN leaf value and a minimum sVIN leaf value or falls between the expected maximum sVIN leaf value and a maximum sVIN leaf value, the match outcome may be categorized as a marginal match. Additionally, if the single matching sVIN leaf value falls between a minimum sVIN leaf value and a maximum sVIN leaf value, the match outcome may be categorized as a bin match.

It is also possible that the match outcome may comprise multiple matching sVIN leaf values. If this happens, the VDC may operate to perform a second set of functions, including, but are not limited to:

if any one of the multiple matching sVIN leaf values does not fall between an expected minimum sVIN leaf value and an expected maximum sVIN leaf value, categorizing the match outcome as a model orphan;

if only a first sVIN leaf of the multiple matching sVIN leaf values falls between the expected minimum sVIN leaf value and the expected maximum sVIN leaf value, assigning a TIC value associated with the first sVIN leaf to the VIN;

if more than one of the multiple matching sVIN leaf values fall between the expected minimum sVIN leaf value and the expected maximum sVIN leaf value, considering only sVIN leaf values that fall between a minimum sVIN leaf value and a maximum sVIN leaf value; and if more than one of the multiple matching sVIN leaf values fall between the minimum sVIN leaf value and the maximum sVIN leaf value, assigning TIC values associated with sVIN leaf values that fall between the minimum sVIN leaf value and the maximum sVIN leaf value.

In one embodiment, the method may comprise constructing the set of lookup tables utilized by the VDC during a training phase using data observed on actual vehicles and updating the set of lookup tables with vehicle data—including trim features—obtained from a plurality of data sources. In one embodiment, the VDC implementing the method may be part of a vehicle data system. In one embodiment, the plurality of data sources may be communicatively connected to the vehicle data system over a public network. In one embodiment, the set of lookup tables may comprise a first lookup table correlating the sVIN stem, the sVIN leaf, and at least one TIC. In one embodiment, the set of lookup tables may be stored local to the VDC. Additionally, in one embodiment, decoded information may be stored local to the VDC. In one embodiment, the decoded information may be provided to a client device over a network connection in response to a request for decoding the VIN. In one embodiment, the decoded information may be provided to the client device in real time, for instance, via a browser application running on the client device.

Other numerous embodiments may also be possible.

Embodiments disclosed herein can provide many advantages. Traditionally, vehicle variations below the body type level cannot be determined by the VIN alone. Even by the manufacturers of vehicles, a more detailed trim identification code may be complex and difficult to establish. Embodiments take a pattern recognition approach to decoding vehicle identification, providing a transparent assessment of vehicle identification numbers and trim identification codes. With embodiments disclosed herein, a user can readily obtain information associated with a vehicle, including information on trim features below the body type level, along with the year, make, model, and body type of the vehicle. In some embodiments, the vehicle identification number decoding system may be observation based, thereby reducing or limiting a need to maintain current records of the vehicle identification numbers by each manufacturer.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

In example embodiments, a vehicle's trim may refer to a configuration of standard equipment, options or amenities. For example, a base trim may have standard features such as manual transmission, standard wheel covers and/or cloth seats. Whereas, a higher end trim may include automatic transmission alloy wheels, leather upholstery and/or air conditioning. Varying a vehicle's trim allows manufacturers of vehicles to produce vehicles that target different market niches. Vehicle manufacturers may utilize a trim identification code to represent a trim of a particular vehicle. In certain example embodiments, such a trim identification code may encompass the year, make, model, and body type information particular to the vehicle.

In some cases, it may be desired or required to accurately decode a vehicle identification number (VIN) at the trim level. Accurate pricing, registration and industry analysis may require or desire that further information beyond the vehicle's year, make, model and body type (YMMB) be available for each vehicle. However, for many manufacturers of automobiles, vehicle variations below the YMMB level may not be determined based on a vehicle's VIN alone. Generally, vehicle manufactures may generate lookup tables including the character code indicating a distinct year, make, model and body type a vehicle within the vehicle's VIN. Yet, manufacturers may not establish, create or form the more accurate or precise mapping of the trim identification code of the vehicle within the vehicle's VIN due to the standardized vehicle identification numbering system.

Figure 1:
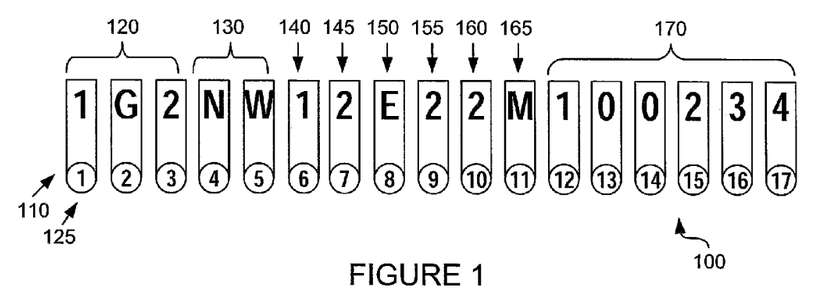
FIG. 1 depicts an example vehicle identification number (VIN) in a standardized format.

FIG. 1 represents an example of a vehicle identification numbering system. In this example, VIN 100 includes seventeen characters, each of which is given a position number 110. Based on the characters associated with each position number 110, a vehicle's make, model, year, and body type may be determined. For example, the first three characters 120 of VIN 100 may uniquely identify the manufacturer of the vehicle using a World Manufacturer Identifier (WMI) code. The first character 125 of WMI 120 may represent a country. Each country or continent may be assigned a specific character such as a number or letter to identify where the vehicle is manufactured. For example, a character "1" in the first character 125 may represent that the vehicle is built in the United States. As those skilled in the art can appreciate, a numbering convention for the first three characters may be provided by the Society of Automotive Engineers.

The fourth through eighth positions 130, 140, 145 and 150 of VIN 100 may be the Vehicle Descriptor Sector (VDS). The VDS may be used to identify the vehicle type, and may include information on vehicle series 130, the body of the vehicle 140, the restraint system of the vehicle 145, and the engine type of the vehicle 150. Thus, the characters entered into the fourth through eight positions of VIN 100 may represent different series, body types, restraint systems, and engine types of vehicles. Each manufacturer may have a unique system for a VDS.

The ninth position 155 may represent a check digit of VIN 100. The check digit may be a redundancy check used for error detection of VIN 100. For example, the check digit may identify if there are errors within VIN 100, such as a mistyped character or digit.

The tenth position 160 of VIN 100 may represent a model year of the vehicle. Therefore, the tenth position 160 of VIN 100 may identify the year that the vehicle was manufactured. The eleventh position 165 of VIN 100 may represent the factory of manufacture of the vehicle. The twelfth through seventeenth positions 170 of VIN 100 may represent a production sequence number. The production sequence number may further include options installed in the vehicle, engine type choices, transmission choices, and/or further options that define the trim of the vehicle.

Table 1 below illustrates an example decomposition of VIN 100.

TABLE 1

| Position | Content | Assigning Body | Description |
|---|---|---|---|
| 1-3 | World Manufacturer Identifier (WMI) | Society of Automotive Engineers | Specifies continent, country, and manufacture |
| 4-8 | Vehicle Descriptor Section (VDS) | Manufacturer, constrained by country-specific regulations | Describes vehicle type, body style, restraint system, engine |
| 9 | Check Digit | Algorithmic | Ensures VIN is valid |
| 10 | Model Year | US NHSTA | Year of Manufacture |
| 11 | Plant Code | Manufacturer | Factory of Manufacture |
| 12-17 | Sequential Number Sequence | Manufacturer | Order in which vehicle produced |

The example shown in FIG. 1 may be used by a manufacturer that produces at least five hundred passenger vehicles per year. For manufacturers where the sequence number is not entirely numeric (e.g. "ABC123" or "12E456" such as when the manufacturer produces fewer than 500 vehicles annually), positions 12-17 may be still be considered sequential if sorted alphanumerically. For manufacturers producing less than five hundred vehicles per year, the character positions twelve through fourteen may indicate a manufacturer identifier and the character positions fifteen through seventeen may indicate a production sequence number.

Vehicle manufacturers may generate lookup tables to enable mapping of Vehicle Identification Numbers (VIN) to a code indicating a distinct year/make/model/body type. However, it is often the case that a mapping of a VIN to a more-detailed trim identification code (TIC) cannot be accurately established, even by the manufacturers themselves. There exist approximate solutions to this problem. However, these solutions each suffer from one or more shortcomings:

An inability to achieve a 1:1 map. Due to the design of VIN standards, the mapping of a VIN to a TIC may result in a "VIN explosion," sometimes by a ratio of 10:1 or even 30:1. That is, these solutions may map a VIN to 10 or more TICs.

When a VIN is "exploded," there is neither an indication of which trim(s) are more likely match candidates or a "match confidence" assigned to the result. There is not a clear and/or accurate indication as to what trim this particular vehicle has.

A more reliable and simpler VIN decoding system may enable dealers, manufacturers and the like, to more accurately price and/or advertise a vehicle without requiring a physical inspection of the vehicle. Furthermore, such a VIN decoding system may increase the reliability of vehicle registration data and legal compliance related to vehicles, and enable more-detailed industry analysis to be conducted by the manufacturers, researchers, financial institutions, industry analysts and/or government statistical agencies.

Embodiments of a VIN decoder disclosed herein, referred to as a Vehicle Identification Number Decoder or simply as VINDecoder (VDC), can overcome these deficiencies and also provide a tool with which a transparent assessment of data quality and accuracy of estimates can be achieved. Since VDC can be observation-based, embodiments can be largely free of the need to keep abreast of manufacturers VIN nuances/format changes, and evolving country-specific regulations. This can be highly desirable due to the significant cost associated with building and maintaining of nuanced, diverse, and dynamic coding standards.

In embodiments, a VDC methodology may comprise a training phase and a decoding phrase. In the training phase, a plurality of reference or lookup tables may be constructed based on observed data. In the decoding phase, TICs may be estimated for VINs utilizing results of the lookup tables created during the training phase.

The construction of VDC reference or lookup tables may comprise applying a set of operations on a training set of observed data where the a) VIN and its YMMB characteristics are both present and/or b) the VIN and its TIC are both present (in which case the YMMB characteristics are also known). As will be describe in detail below, training data may be provided in many ways. In one embodiment, the training data is provided by a data source external to the VDC. In one embodiment, the training data is provided by a data source external to a network where the VDC resides. Example operations of the VDC will now be described with reference to FIG. 2.

Figure 2:
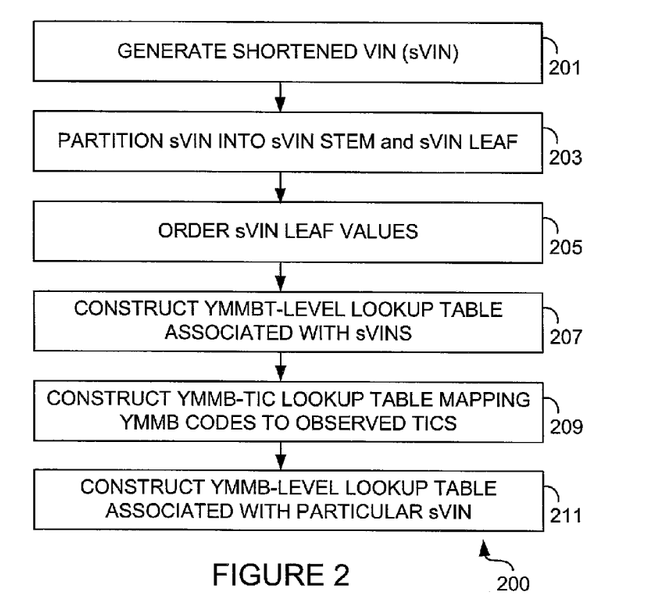
FIG. 2 depicts a flow diagram illustrating an example method of constructing a Vehicle Identification Number Decoder (VDC), according to one embodiment disclosed herein.

FIG. 2 depicts a flow diagram illustrating an example method 200 of constructing a plurality of reference tables for a VDC, according to one embodiment disclosed herein. As will be described below with reference to FIG. 7, in one embodiment, these tables may be constructed at a server computer configured to perform method 200. In one embodiment, the training set of observed data may be provided to the server computer from a data source. In one embodiment, the data source may be communicatively connected to the server computer over a network connection. In one embodiment, the server computer may reside in a private network. In one embodiment, the data source may reside at a location external to the private network.

In the example of FIG. 2, method 200 may comprise generating a shortened VIN (sVIN) from a VIN (step 201). This operation may be referred to as VIN collapsing. This VIN may be from a training set of observed data. In one embodiment, prior to generating the sVIN, method 200 may further comprise inspecting the VIN and determining whether the VIN is valid by verifying the consistency between the VIN and the check digit in the $9^{th}$ position of the VIN. If the VIN is not valid, an error message may be generated. If the VIN is valid, method 200 may proceed to step 201. In one embodiment, a sVIN may be generated from characters at positions 1-8 and 10-17 of a VIN. The check digit in the $9^{th}$ position of the VIN is not included in the sVIN.

Method 200 may further comprise partitioning the 16-character sVIN into a sVIN Stem and a sVIN Leaf (step 203). In this case, the sVIN Stem is made of characters at positions 1-10 of the sVIN and the sVIN Leaf is made of characters at positions 11-16 of the sVIN.

Method 200 may comprise ordering sVIN Leaf values (step 205). When the production sequence is entirely numeric, this is equivalent to the sequence number. When the sVIN Leaf is alphanumeric, this operation involves sorting the sVINs by sVIN Leaf. For example, an alphanumeric value of "ABB999" precedes "ABC456" and "XYZ010" precedes "XYZ011". Table 2 below illustrates this process using example data. In this example, the primary alphanumeric sort is by sVIN Stem, followed by sVIN Leaf.

TABLE 2

Figure 3:
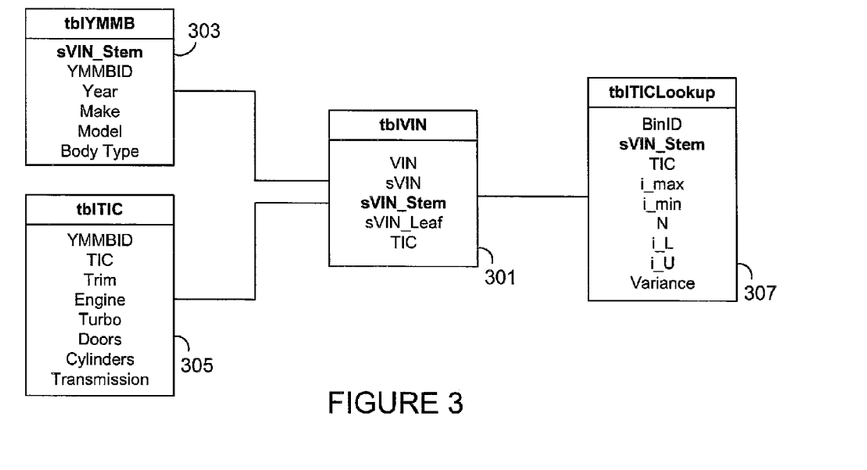
FIG. 3 depicts an example entity relationship diagram for the VDC, according to one embodiment disclosed herein.

(also referred to herein as "tblVIN", shown in FIG. 3 as tblVIN 301).

| VIN | sVIN | sVIN Stem | sVIN Leaf | TIC |
|---|---|---|---|---|
| 19UUA86589A012728 | 19UUA8659A012728 | 19UUA8659A | 012728 | 123456 |
| 19UUA86539A018677 | 19UUA8659A018677 | 19UUA8659A | 018677 | 123456 |
| 19XFA16569E006972 | 19XFA1659E006972 | 19XFA1659E | 006972 | 223457 |
| 19XFA16599E014581 | 19XFA1659E014581 | 19XFA1659E | 014581 | 223457 |
| 19XFA165X9E016663 | 19XFA1659E016663 | 19XFA1659E | 016663 | 223457 |
| 19XFA16579E018581 | 19XFA1659E018581 | 19XFA1659E | 018581 | 223457 |
| 1FBSS3BL1ADA82797 | 1FBSS3BLADA82797 | 1FBSS3BLAD | A82797 | 917043 |
| 1FBSS3BL1BDA18115 | 1FBSS3BLBDA18115 | 1FBSS3BLBD | A18115 | 623469 |
| 1FBSS3BL1BDA18198 | 1FBSS3BLBDA18198 | 1FBSS3BLBD | A18198 | 623469 |
| 1FBSS3BL1BDB10213 | 1FBSS3BLBDB10213 | 1FBSS3BLBD | B10213 | 623469 |
| 1FBSS3BL1BDB10217 | 1FBSS3BLBDB10217 | 1FBSS3BLBD | B10217 | 623470 |
| 1FBSS3BL1BDB10789 | 1FBSS3BLBDB10789 | 1FBSS3BLBD | B10789 | 623470 |

Method 200 may further comprise generating a Year/Make/Model/Body Type/Trim (YMMBT)-level lookup table associated with particular sVINs where both the TIC and valid VIN are known (step 207). In one embodiment, a YMMBT-level lookup table can comprise pairs of YMMB codes and sVINs that have been observed. Table 3 below illustrates an example YMMBT-level lookup table.

TABLE 3

(also referred to herein as "tblYMMB", shown in FIG. 3 as tblYMMB 303).

| Row | sVIN Stem | YMMBID | Year | Make | Model | Body Type |
|---|---|---|---|---|---|---|
| 1 | 19UUA8659A | 1234 | 2009 | Honda | Acura | 4 Door Sedan |
| 2 | 19XFA1659E | 2234 | 2009 | Honda | Civic | 4 Door Sedan |
| 3 | 1FBSS3BLAD | 9170 | 2010 | Ford | E-350 | Wagon |
| 4 | 1FBSS3BLBD | 6234 | 6234 | Ford | E-350 | Wagon |

Method 200 may comprise generating a YMMB-TIC lookup table mapping YMMB codes to all observed TICs (step 209). Table 4 below illustrates an example YMMB-TIC lookup table.

TABLE 4

(also referred to herein as "tblTIC", shown in FIG. 3 as tblTIC 305).

| YMMBID | TIC | Trim | Engine | Turbo | Doors | Cylinder | Transmission |
|---|---|---|---|---|---|---|---|
| 9170 | 917043 | TL | 3.5 L | N | 4 | 6 | 5-Speed Automatic |
| 2234 | 623469 | LX | 1.8 L | N | 4 | 4 | 5-Speed Automatic |
| 6234 | 623469 | XL SuperExtended | 5.4 L | N | 4 | 8 | 5-Speed Automatic |
| 6234 | 623470 | XLT SuperExtended | 5.4 L | N | 4 | 6 | 5-Speed Automatic |

Method 200 may comprise generating a Year/Make/Model/Body Type (YMMB)-level lookup table associated with a particular sVIN based on a set of observations where both the YMMB (and perhaps the TIC) and the VIN are known (step 211). Table 5 below illustrates an example YMMB-level lookup table.

TABLE 5

(also referred to herein as "tblTICLookup", shown in FIG. 3 as tblTICLookup 307).

| BinID | sVIN Stem | TIC | $i_{min}$ | $i_{max}$ | n | $i_L$ | $i_U$ | $\sigma^2$ |
|---|---|---|---|---|---|---|---|---|
| 1 | 19UUA8659A | 123456 | 012728 | 018677 | 2 | 009753 | 021651 | 330.5 |
| 2 | 19XFA1659E | 223457 | 006972 | 018581 | 4 | 004651 | 020902 | 309.6 |
| 3 | 1FBSS3BLAD | 917043 | A82797 | A82797 | 1 | A82797 | A82797 | NA |
| 4 | 1FBSS3BLBD | 623469 | A18115 | A18198 | 2 | A18074 | A18239 | 4.6 |
| 5 | 1FBSS3BLBD | 623469 | B10213 | B10213 | 1 | B10213 | B10213 | NA |
| 6 | 1FBSS3BLBD | 623470 | B10217 | B10789 | 2 | B09931 | B11075 | 31.8 |

When the SVIN Leaf values are entirely numeric, this process creates a separate row (identified by a corresponding BinID) for each observed sVIN Stem and TIC pair and assigns two values: $i_{min}$ and $i_{max}$ where $i_{min}$ is the smallest sVIN Leaf value associated with that sVIN Stem/TIC pair and $i_{max}$ is the largest sVIN Leaf value associated with that sVIN Stem/TIC pair.

When the sVIN Leaf values are alphanumeric, this process creates a separate row for each observed sVIN Stem/TIC pair for which the leading non-numeric characters in the sVIN Leaf are the same and assigns two values: $i_{min}$ and $i_{max}$ where $i_{min}$ is the smallest sVIN Leaf value associated with that sVIN Stem/TIC pair and $i_{max}$ is the largest sVIN Leaf value associated with that sVIN Stem/TIC pair for which the non-numeric part of the sVIN Leaf is identical.

If n is the number of observations including falling between $i_{min}$ and $i_{max}$, then the expected minimum $i_L$ (lower bound) and maximum $i_U$ (upper bound) can be estimated based on the theory of order statistics and leveraging the knowledge that the $k^{th}$ order statistic from a sample of size follows a beta distribution: $Beta(k, n+1-k)$. Therefore, $$i_L = \max\left(1, i_{max} - \frac{n+1}{n}(i_{max} - i_{min})\right)$$

$$i_U = \min\left(999999, i_{min} + \frac{n+1}{n}(i_{max} - i_{min})\right).$$

Variance variable $$\sigma^2(i_L) = \sigma^2(i_U) = \frac{n}{(n+1)^2(n+2)}(i_{max} - i_{min})$$

represents the variance between the expected minimum $i_L$ and the expected maximum $i_U$ sVIN Leaf values associated with each BinID. Over time, pairs of VINs (and their derivative sVIN Stem and SVIN Leaf values) and TICs will become available. As new data becomes available, the tblTIC Lookup table is updated to increase the confidence of matching of future observations. An example of the relationship between these tables is illustrated in FIG. 3.

Utilizing results of these lookup tables created during the training phase, an embodiment of the VDC may operate to estimate TIC values for each given VIN, thereby decoding the VIN at the trim level. This process may be referred to as the decoding or estimation phase of the VDC methodology.

Figure 4:
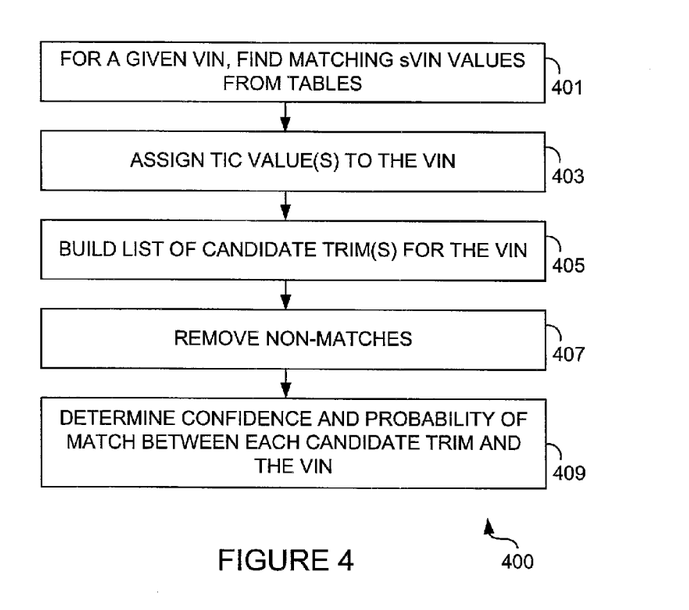
FIG. 4 depicts a flow diagram illustrating an example of decoding a VIN utilizing an embodiment of the VDC.

FIG. 4 depicts a flow diagram illustrating an example of decoding a VIN utilizing an embodiment of the VDC. In this example, method 400 may comprise finding, for a given VIN, matching sVIN values from tables (step 401), assigning TIC value(s) to the VIN (step 403), building a list of candidate trim(s) for the VIN (step 405), removing non-matches (step 407), and determining confidence and probability of a match between each candidate trim and the VIN (step 409).

In one embodiment, method 400 may further comprise, prior to matching sVIN values from tables for a given VIN, collapsing the VIN into a sVIN, extracting sVIN Stem and sVIN Leaf values from the sVIN, and storing same in a table called tblVIN. In one embodiment, matching sVIN values from tables for a given VIN may comprise merging tblVIN with tblTICLookup based on the sVIN values stored in these tables. This process may produce the following three possible match outcomes:

At least one one-to-one match between a row in tblVIN and a row in tblTICLookup. These are called singleton matches.

At least one one-to-many match between a row in tblVIN and several rows in tblTICLookup. These are called multimatches.

There is not a match between the tables. The rows in tblVIN that do not match are categorized as "Model Orphan".

In this example, TIC values may be assigned to the VIN at step 403 depending upon a match outcome from step 401. This process is further described below with reference to FIGS. 5 and 6 in which FIG. 5 depicts a diagrammatic representation of how various TIC values may be associated with a VIN and FIG. 6 depicts a flow diagram illustrating example process 600 of associating various TIC values with a VIN.

Figure 5:
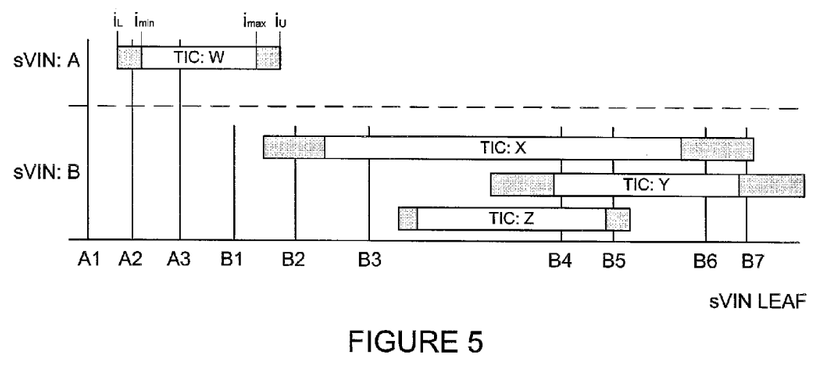
FIG. 5 depicts a diagrammatic representation of how various trim identification codes may be associated with a VIN, according to one embodiment disclosed herein.
Figure 6:
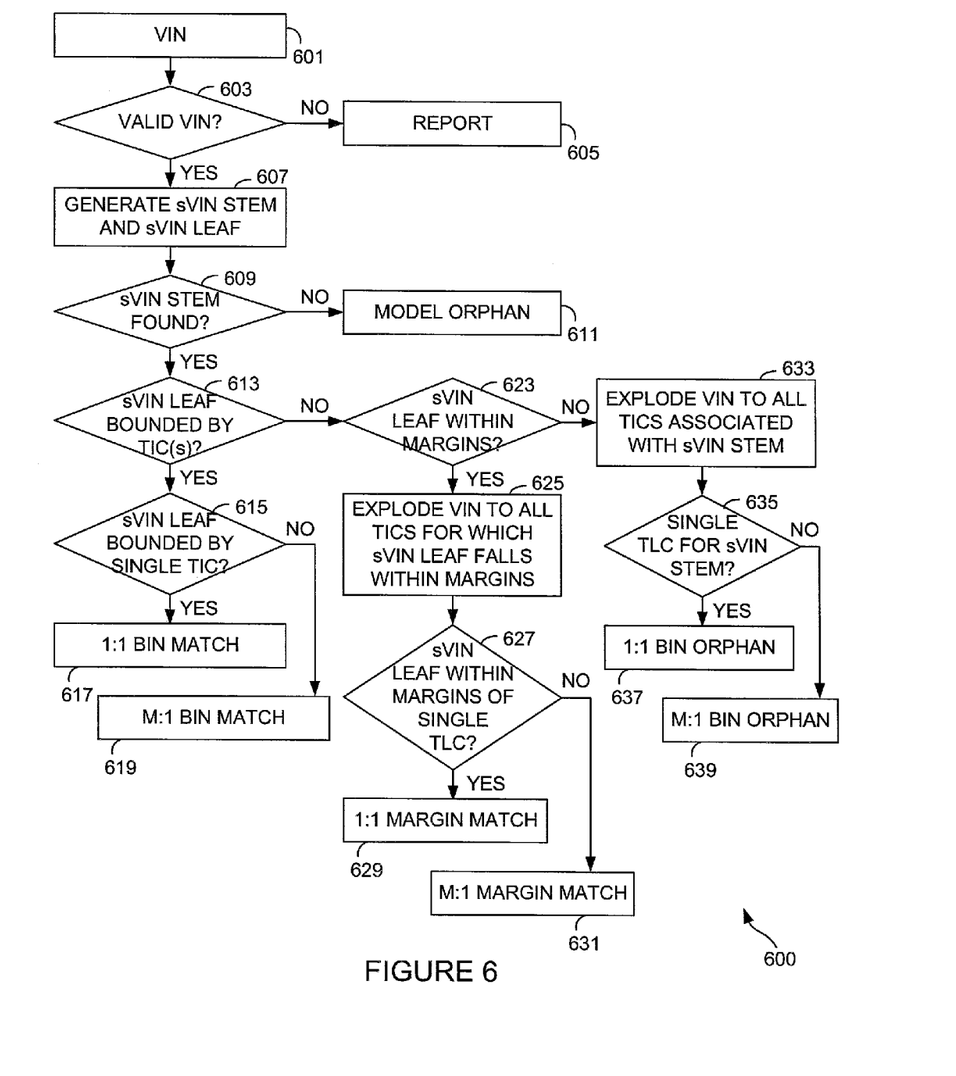
FIG. 6 depicts a flow diagram illustrating an example process of associating various trim identification codes with a VIN, according to one embodiment disclosed herein.

Referring to FIG. 5, "sVIN A" is an example of a singleton match, since only TIC W (a TIC value) is a match. In this example, there might be three possible cases:

Case A1: If the VIN Leaf of the entry in tblVIN does not fall between $i_U$ and $i_L$, then the VIN is categorized as a "Model Orphan". In this case, every distinct TIC in tblTICLookup sharing the same sVIN_Stem is assigned to the VIN. This is referred to as "1:1 Bin Orphan" (step 637) in FIG. 6. That is, if there is only one TIC that has the sVIN_Stem, it is a "1:1 Bin Orphan" (step 637). If there is more than one TIC that maps to the sVIN_Stem, it is a "M:1 Bin Orphan" (step 639).

Case A2: If the VIN Leaf of the entry in tblVIN falls between $i_{min}$ and $i_L$ or falls between $i_{max}$ and $i_U$, then the associated TIC value from the tblTICLookup table is assigned to the VIN and the match is called "marginal". In the example, the VIN in tblVIN having sVIN A would be assigned to TIC W and categorized as a marginal match. This is referred to as "1:1 Margin Match" (step 629) in FIG. 6.

Case A3: If the VIN Leaf for the row in tblVIN, $VL_e$, falls between $i_{min}$ and $i_{max}$, then the associated TIC value from the tblTICLookup table is assigned to the VIN in tblVIN and the match is called "bounded". In the example, the VIN in tblVIN having sVIN A would be assigned to TIC W and categorized as a bin match. This is referred to as "1:1 Bin Match" (step 617) in FIG. 6.

"sVIN B" in FIG. 5 is an example of a multimatch, since TICs X,Y, and Z are all matches. In this example, there might be several possible cases:

Case B1: If the VIN Leaf of the entry in tblVIN does not fall between $i_U$ and $i_L$ for any TIC, the VIN is categorized as a "Model Orphan". This is referred to as "M:1 Bin Orphan" (step 639) in FIG. 6.

Case B2: If the VIN Leaf of the entry in tblVIN falls between $i_{min}$ and $i_L$ or between $i_{max}$ and $i_L$ for only one TIC, then the associated TIC value from the tblTI-CLookup table is assigned to the VIN and the match is called "marginal". In the example, the VIN in tblVIN having sVIN B would be assigned to TIC X and labeled as a "1:1 Margin Match" (same as Case A2).

Case B3: If the VIN Leaf of the entry in tblVIN falls within $i_{min}$ and $i_{max}$ for one-and-only-one TIC, then the associated TIC value from the tblTICLookup is assigned to the VIN in tblVIN and the match is called "bounded". In the example, the VIN in tblVIN having sVIN B would be assigned to TIC X and labeled as a "1:1 Bin Match" (same as Case A3).

Case B4: If the VIN Leaf of the entry in tblVIN falls within $i_{min}$ and $i_{max}$ for more than one TICs, then the associated TIC values from the tblTICLookup table are assigned to the VIN in tblVIN and the match is called "bounded". For each value in which the sVIN matches and the new observation lies interior to the $i_{min}$ and $i_{max}$ values, a separate row is generated. In the example, the VIN in tblVIN having sVIN B would be assigned to TICs X, Y, and Z and labeled as a "M:1 Bin Match" for each TIC. This is referred to as "M:1 Bin Match" (step 619) in FIG. 6.

Case B5: If the VIN Leaf of the entry in tblVIN falls within $i_{min}$ and $i_{max}$ for more than one TIC, and also falls between $i_{min}$ and $i_L$ or between $i_{max}$ and $i_L$ for one or more other TICs, only the bounded matches are considered. In the example, the VIN in tblVIN having sVIN B would be assigned to TICs X and Y but not to TIC Z since the VIN Leaf of the entry in tblVIN falls within the margin as shown in FIG. 5. This is also labeled as a "M:1 Bin Match" (same as Case B4).

Case B6: If the VIN Leaf of the entry in tblVIN falls within $i_{min}$ and $i_{max}$ for only one TIC, and also falls between $i_{min}$ and $i_L$ or between $i_{max}$ and $i_L$ for one or more other TICs, only the bounded matches are considered. In the example, the VIN in tblVIN having sVIN B would be assigned to TIC Y and labeled as a "1:1 Bin Match" (same as Case B3).

Case B7: If the VIN Leaf of the entry in tblVIN does not fall within $i_{min}$ and $i_{max}$ for any of the TICs, but falls between $i_{min}$ and $i_L$ or between $i_{max}$ and $i_L$ for more than one TICs, then the associated TIC values from the tblTICLookup table are assigned to the VIN in tblVIN and the match is called "marginal". In the example, the VIN in tblVIN having sVIN B would be assigned to TICs X and Y and labeled as a "M:1 Margin Match" for each TIC. This is referred to as "M:1 Margin Match" (step 631) in FIG. 6.

Figure 7:
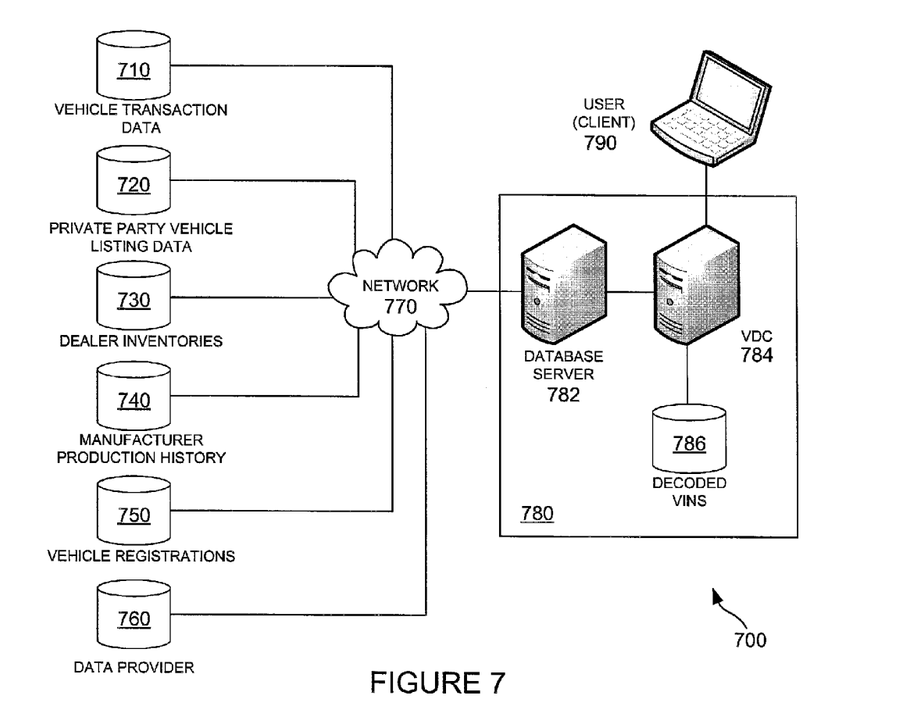
FIG. 7 depicts an example network topology that may enable data transformation according to embodiments disclosed herein.

Referring to FIG. 6, a VIN may be provided to an embodiment of a VDC (step 601). An example of VDC 784 is shown in FIG. 7. The VDC may operate to determine whether the VIN is valid (step 603). If the VIN is not valid, the VDC may generate a report or otherwise send out a notification that the VIN is not valid (step 605). A VIN-level output from step 605 may comprise the following information:

| Valid VIN | TIC | VIN Explosion | Match Probability | Confidence | Category |
|---|---|---|---|---|---|
| 0 | NA | NA | NA | NA | Invalid VIN |

If the VIN is valid, the VDC may proceed to generate sVIN Stem and sVIN Leaf values (step 607) by removing the check digit to produce a shortened VIN (sVIN) and partitioning the sVIN into sVIN Stem and sVIN Leaf as described above. The VDC may attempt to match the sVIN Stem (step 609) across tblVIN and tblTICLookup tables as described above. If the sVIN Stem is not found (there is no match), the VDC may categorize the VIN as "Model Orphan" (step 611) as follows:

| Valid VIN | TIC | VIN Explosion | Match Probability | Confidence | Category |
|---|---|---|---|---|---|
| 1 | NA | NA | NA | NA | Model Orphan |

If the sVIN Stem is found, the VDC may operate to determine whether the sVIN Leaf is bounded by any TIC(s) (step 613). If the sVIN Leaf is not bounded by any TICs, the VDC may check to see (step 623) whether the sVIN Leaf falls between any margins (between $i_{min}$ and $i_L$ or between $i_{max}$ and $i_L$) as described above. If the sVIN Leaf is bounded by one or more TICs, the VDC may check to see (step 615) whether the sVIN Leaf is bounded by a single TIC. If so, the VDC may operate to categorize the VIN as "1:1 Bin Match" (step 617) as follows:

| Valid VIN | TIC | VIN Explosion | Match Probability | Confidence | Category |
|---|---|---|---|---|---|
| 1 | TIC1 | 0 | 100% | y1% | 1:1 Bin Match |

If the sVIN Leaf is bounded by more than one TICs, the VDC may operate to categorize the VIN as "M:1 Bin Match" (step 619) as follows:

| Valid VIN | TIC | VIN Explosion | Match Probability | Confidence | Category |
|---|---|---|---|---|---|
| 1 | TIC1 | 1 | x1% | y1% | M:1 Bin Match |
| 1 | TIC2 | 1 | x2% | y2% | M:1 Bin Match |
| ... | | | | | |
| 1 | TICn | 1 | xn% | yn% | M:1 Bin Match |

If the sVIN Leaf is not bounded by any TICs, but does fall within margins (between $i_{min}$ and $i_L$ or between $i_{max}$ and $i_L$) of one or more TICs, the VDC may operate to explode the VIN to all TICs for which the sVIN Leaf falls within the margins (step 625) and may further determine whether the sVIN Leaf falls within the margins of only a single TIC (step 627). If so, the VDC may operate to categorize the VIN as "1:1 Margin Match" (step 629) as follows:

| Valid VIN | TIC | VIN Explosion | Match Probability | Confidence | Category |
|---|---|---|---|---|---|
| 1 | TIC1 | 0 | 100% | y1% | 1:1 Margin Match |

If the sVIN Leaf falls within the margins of more than one TICs, the VDC may operate to categorize the VIN as "M:1 Margin Match" (step 631) as follows:

| Valid VIN | TIC | VIN Explosion | Match Probability | Confidence | Category |
|---|---|---|---|---|---|
| 1 | TIC1 | 1 | x1% | y1% | M:1 Margin Match |
| 1 | TIC2 | 1 | x2% | y2% | M:1 Margin Match |
| ... | | | | | |
| 1 | TICn | 1 | xn% | yn% | M:1 Margin Match |

If the sVIN Leaf neither is bounded by any TICs nor falls within margins (between $i_{min}$ and $i_L$ or between $i_{max}$ and $i_L$) of any TICs, the VDC may operate to explode the VIN to all TICs associated with the sVIN Stem (step 633) and may further determine whether only a single TIC is matched to the sVIN Stem (step 635). If so, the VDC may operate to categorize the VIN as "1:1 Bin Orphan" (step 637) as follows:

| Valid VIN | TIC | VIN Explosion | Match Probability | Confidence | Category |
|---|---|---|---|---|---|
| 1 | TIC1 | 0 | 100% | y1% | 1:1 Bin Orphan |

If more than one TICs can be matched to the sVIN Stem for the given VIN, the VDC may operate to categorize the VIN as "1:1 Bin Orphan" (step 637) as follows:

| Valid VIN | TIC | VIN Explosion | Match Probability | Confidence | Category |
|---|---|---|---|---|---|
| 1 | TIC1 | 1 | x1% | y1% | M:1 Bin Orphan |
| 1 | TIC2 | 1 | x2% | y2% | M:1 Bin Orphan |
| ... | | | | | |
| 1 | TICn | 1 | xn% | yn% | M:1 Bin Orphan |

Referring back to FIG. 4, after appropriate TIC values are assigned to the VIN as described above, method 400 may operate to build a list of candidate trim(s) for the VIN (step 405). In one embodiment, building a list of candidate trim(s) for the VIN may comprise creating or updating a table containing VIN/TIC matches obtained as described above. The table containing VIN/TIC matches may be referred to as tblCandidate. In one embodiment, the tblCandidate table may be merged with tblTIC matched on the TIC such that tblCandidate may comprise all the bounded and marginal matches and their associated TICs. The orphan list which is then merged to tblYMMB matched on the sVIN Stem and further merged onto tblTIC according to the YMMB code. The resulting table thus includes features of each candidate trim along with, where known, the same feature columns for the VIN in tblVIN.

The list of candidate trim(s) for the VIN can be optimized (step 407). Optimizing the list of candidate trim(s) for the VIN may comprise removing non-matches. For instances, where a match is marginal or an entry is an orphan, the values of the features from tblVIN and those from tblTIC are compared. For cases where the features are present and one or more features do not match, a field called mismatch is set equal to 1. If all features match or the match is considered "bounded", then mismatch is set to 0.

After the mismatches have been determined, each VIN is examined to ensure that it has at least one value where mismatch=0. If so, then all mismatch=1 cases for that VIN are deleted. If all rows pertaining to a VIN are considered mismatches, none of them are removed. In cases where the remaining candidate matches are mismatches and there is a mixture of marginal and bounded matches, the rows pertaining to the marginal matches may be deleted.

The VDC may be further configured to compute a confidence score and match probability for each row in the tblCandidate table associated with the given VIN (step 409). For example:

a. If all rows for a VIN e in tblVIN are considered orphans, then compute
   Confidence: $c_e=1/m$ where m is the number of rows pertaining to VIN e in tblCandidate
   Match Probability: $mp_e=1/m$ where m is the number of rows pertaining to VIN e in tblCandidate b. If all rows for a VIN e in tblVIN are considered bounded, then compute
   Confidence: $c_e=1-p_e(1-p_e)$ where $$p_e = \frac{SVin\ Leaf - i_{min}}{i_{max} - i_{min}}$$

Match Probability: $mp_e=(i_{max}-i_{min})_e c_e / \Sigma_{e \in sVIN\ Leaf} c_e(i_{max}-i_{min})_e$ c. If all rows for a VIN e are marginal matches, then compute:
   Confidence: $c_e=1-4p_e(1-p_e)$ where $$p_e = \frac{SVin\ Leaf - i_{min}}{i_{max} - i_{min}}$$

Match Probability: $mp_e=(i_{max}-i_{min})_e c_e / \Sigma_{e \in sVIN\ Leaf} c_e(i_{max}-i_{min})_e$ The tblCandidate table may be manipulated for output in various ways. For example, the rows may be sorted in order of match probability. As another example, a subset of the total number of rows may be selected for output. The output contains decoded information for the given VIN, including trim features, based on the confidence score and match probability thus generated. As will be described below, the output may be presented on a user device in response to a request for decoding the VIN from the user device.

Those skilled in the art will appreciate that method 400 may be adapted in many ways. For example, method 400 may be adapted to process multiple input VINs, perhaps simultaneously or substantially simultaneously. In one embodiment, method 400 may be adapted to process VINs in response to a request in real time. In one embodiment, method 400 may implement a batch process policy and may process VINs at a predetermined time interval. Further, method 400 may be adapted to perform some, but not all, of the steps described above. For example, step 407 may be optional. Moreover, method 400 may be adapted to repeat one or more of the steps described above.

Those skilled in the art will also appreciate that the network environment in which the VDC methodology described above is practiced may be implemented in various ways. FIG.

7 depicts an example network topology that may enable data transformation according to embodiments disclosed herein. In this example, topology 700 includes a set of entities including a vehicle data system 780. Vehicle data system 780 may be communicatively connected over network 770 to various data sources, including vehicle transaction database 710, private party vehicle listing data 720, dealer inventories 730, manufacturer production history 740, vehicle registration database 750, and data provider 760. The same VIN may show up in more than one of these data sources.

Vehicle transaction database 710 may correspond to a dealer or retail outlet regarding new or used vehicles sold and may contain any type of vehicle transaction data. For example, syndicated sales data company's aggregate new and used sales transaction data from the data management systems of particular dealers. A data provider associated with vehicle transaction database 710 may track when a buyer purchases a vehicle from a specific dealer and collect or obtain data regarding the make, model, year, body type, trim, Trim Identification Code (TIC), and/or VIN of the purchased vehicle. In one embodiment, vehicle transaction database 710 does not include personally identifiable information (PII) about the buyer. Example PII may include the buyer's name, address, etc. Vehicle transaction database 710 may not include such personal data.

Private party vehicle listing data 720 may contain private party vehicle listings that are posted on a network, such as the internet, or available through used car data aggregators. In one embodiment, private party vehicle listing data 720 is provided by sellers. A data provider associated with private party vehicle listings 720 may track when a buyer purchases a vehicle from a seller and collect or obtain data regarding the make, model, year, body type, trim, TIC and/or VIN of the purchased vehicle.

Dealer inventory 730 may be maintained by one or more inventory polling companies, inventory management companies or listing aggregators which may obtain and store inventory data from one or more of dealers. Inventory polling companies are typically commissioned by the dealer to pull data from dealers and format the data for use on websites and by other systems. Inventory management companies may manually upload inventory information (photos, description, specifications) on behalf of the dealer. Listing aggregators get their data by "scraping" or "spidering" websites that display inventory content and receiving direct feeds from listing websites (for example, AutoTrader.com, FordVehicles.com, etc.).

Manufacturer production history 740 may contain information regarding vehicles that are manufactured by various manufacturers. A data provider associated with manufacturer production history 740 may collect information relevant to the production of certain vehicles, including a vehicle's production date, make, model, year, body type, trim, TIC, VIN, etc.

Vehicle registration database 750 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes. In one embodiment, vehicle registration database 750 does not include personally identifiable information (PII) about the user. Example PII may include the buyer's name, address, etc. Like vehicle transaction database 710, vehicle registration database 750 may not include such personal data.

In one embodiment, a training set containing data observed on actual vehicles may be obtained from data provider 760 and utilized by the VDC as described above. In one embodiment, vehicle data system 780 may build a training set based on vehicle data obtained from vehicle transaction database 710, private party vehicle listing 720, dealer inventories 730, manufacturer production history 740, vehicle registration database 750, data provider 760, or a combination thereof. Other embodiments of creating or obtaining a training set may also be possible.

Vehicle data system 780 may comprise database server 782 configured to communicate with various data sources and manage data gathered from these external sources. In one embodiment, vehicle data system 780 maintains a training set locally and updates it with new information collected from various data sources over network 770.

Network 770 may comprise, for example, wireless and/or wired networks such as the internet, wide area network (WAN), publically switched telephone network (PTSN) or any other type of electronic or non-electronic communication link such as mail, courier services or the like.

Vehicle data system 780 may comprise one or more computer systems, each having one or more non-transitory computer readable media storing instructions translatable by at least one central processing unit to perform at least some of the functionality associated with embodiments disclosed herein. In the example shown in FIG. 7, in addition to database server 782, vehicle data system 780 may further comprise server 784 configured to implement the VDC methodology described herein. Server 784 may represent one or more server computers. For example, server 784 may comprise a web server communicatively connected to client 790 and capable of responding to a request for decoding a VIN from client 790. Server 784 may further comprise an application server communicatively connected to database 782 and having access to a plurality of lookup tables managed by database server 782. These lookup tables may store information generated based on a training set in accordance with the VDC methodology described above. For the sake of brevity, machines and control logic necessary to implement the VDC methodology in vehicle data system 780 are collectively referred to as VDC 784.

Client 790 may comprise a user device communicatively connected to vehicle data system 780 over a network connection. The user device and vehicle data system 780 may reside on the same network or different networks. If a user device is sending a request for decoding a VIN over an internal network connection, a VIN decoding application running on VDC 784 may respond directly, without the need to go through a web server. If a user device is communicatively connected to data vehicle system 780 over a network connection involving a public network such as the Internet, a web server may forward the request and the VIN decoding application running on VDC 784 may operate to decode the VIN and provide a result to the web server for responding to the quest. In one embodiment, VDC 784 may store the decoded VIN in database 786.

It should be noted here that not all of the various entities depicted in topology 700 are necessary, or even desired, in embodiments disclosed herein, and that certain of the functionality described with respect to the entities depicted in topology 700 may be combined into a single entity or eliminated altogether. Additionally, in some embodiments other data sources not shown in topology 700 may be utilized. Topology 700 is therefore exemplary only and should in no way be taken as imposing any limitations on embodiments disclosed herein.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as standalone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for decoding a vehicle identification number (VIN), comprising:
    at a first computer having a processor and a memory storing instructions executable by the processor for:
    partitioning a shortened VIN (sVIN) into a sVIN stem and a sVIN leaf;
    finding one or more matching sVIN leaf values from a set of look up tables utilizing the sVIN stem;
    assigning one or more trim identification code (TIC) values to the VIN depending upon a match outcome;
    constructing a candidate list utilizing the one or more TIC values, the candidate list containing one or more candidate trims for the VIN;
    generating a confidence score and a match probability for each of the one or more candidate trims; and
    based on the confidence score and the match probability generated for each of the one or more candidate trims, providing decoded information for the VIN to a second computer communicatively connected to the first computer over a network connection, the decoded information including trim data associated with at least one of the one or more candidate trims.

2. The method of claim 1, further comprising:
    optimizing the candidate list by removing non-matches.

3. The method of claim 1, further comprising:
    generating the sVIN by extracting a subset of characters from the VIN.

4. The method of claim 1, further comprising:
    determining whether the VIN is valid.

5. The method of claim 4, further comprising:
    generating a notification if the VIN is not valid.

6. The method of claim 1, wherein the match outcome comprises a single matching sVIN leaf value, further comprising:
  if the single matching sVIN leaf value does not fall between an expected minimum sVIN leaf value and an expected maximum sVIN leaf value, assigning every distinct TIC value in a first lookup table that share the sVIN stem to the VIN; and
  if the single matching sVIN leaf value falls between the expected minimum sVIN leaf value and the expected maximum sVIN leaf value, assigning a TIC value associated with the sVIN leaf to the VIN.

7. The method of claim 6, further comprising:
  if the single matching sVIN leaf value falls between the expected minimum sVIN leaf value and a minimum sVIN leaf value or falls between the expected maximum sVIN leaf value and a maximum sVIN leaf value, categorizing the match outcome as a marginal match; and
  if the single matching sVIN leaf value falls between a minimum sVIN leaf value and a maximum sVIN leaf value, categorizing the match outcome as a bin match.

8. The method of claim 1, wherein the match outcome comprises multiple matching sVIN leaf values, further comprising:
  if any one of the multiple matching sVIN leaf values does not fall between an expected minimum sVIN leaf value and an expected maximum sVIN leaf value, categorizing the match outcome as a model orphan;
  if only a first sVIN leaf of the multiple matching sVIN leaf values falls between the expected minimum sVIN leaf value and the expected maximum sVIN leaf value, assigning a TIC value associated with the first sVIN leaf to the VIN;
  if more than one of the multiple matching sVIN leaf values fall between the expected minimum sVIN leaf value and the expected maximum sVIN leaf value, considering only sVIN leaf values that fall between a minimum sVIN leaf value and a maximum sVIN leaf value; and
  if more than one of the multiple matching sVIN leaf values fall between the minimum sVIN leaf value and the maximum sVIN leaf value, assigning TIC values associated with sVIN leaf values that fall between the minimum sVIN leaf value and the maximum sVIN leaf value.

9. The method of claim 1, wherein the set of look up tables comprises a first lookup table correlating the sVIN stem, the sVIN leaf, and at least one TIC, the first lookup table being constructed prior to receiving a request from the second computer to decode the VIN.

10. A computer program product comprising at least one non-transitory computer readable medium storing instructions translatable by a first computer to perform:
  partitioning a shortened vehicle identification number (sVIN) into a sVIN stem and a sVIN leaf;
  finding one or more matching sVIN leaf values from a set of look up tables utilizing the sVIN stem;
  assigning one or more trim identification code (TIC) values to the VIN depending upon a match outcome;
  constructing a candidate list utilizing the one or more TIC values, the candidate list containing one or more candidate trims for the VIN;
  generating a confidence score and a match probability for each of the one or more candidate trims; and
  based on the confidence score and the match probability generated for each of the one or more candidate trims, providing decoded information for the VIN to a second computer communicatively connected to the first computer over a network connection, the decoded information including trim data associated with at least one of the one or more candidate trims.

11. The computer program product of claim 10, wherein the instructions are further translatable by the first computer to remove non-matches from the candidate list.

12. The computer program product of claim 10, wherein the instructions are further translatable by the first computer to generate the sVIN by extracting a subset of characters from the VIN.

13. The computer program product of claim 10, wherein the instructions are further translatable by the first computer to determine whether the VIN is valid.

14. The computer program product of claim 10, wherein the instructions are further translatable by the first computer to generate a notification if the VIN is not valid.

15. The computer program product of claim 10, wherein the match outcome comprises a single matching sVIN leaf value, and wherein the instructions are further translatable by the first computer to perform:
  if the single matching sVIN leaf value does not fall between an expected minimum sVIN leaf value and an expected maximum sVIN leaf value, assigning every distinct TIC value in a first lookup table that share the sVIN stem to the VIN; and
  if the single matching sVIN leaf value falls between the expected minimum sVIN leaf value and the expected maximum sVIN leaf value, assigning a TIC value associated with the sVIN leaf to the VIN.

16. The computer program product of claim 15, wherein the instructions are further translatable by the first computer to perform:
  if the single matching sVIN leaf value falls between the expected minimum sVIN leaf value and a minimum sVIN leaf value or falls between the expected maximum sVIN leaf value and a maximum sVIN leaf value, categorizing the match outcome as a marginal match; and
  if the single matching sVIN leaf value falls between a minimum sVIN leaf value and a maximum sVIN leaf value, categorizing the match outcome as a bin match.

17. The computer program product of claim 15, wherein the match outcome comprises multiple matching sVIN leaf values, and wherein the instructions are further translatable by the first computer to perform:
  if any one of the multiple matching sVIN leaf values does not fall between an expected minimum sVIN leaf value and an expected maximum sVIN leaf value, categorizing the match outcome as a model orphan;
  if only a first sVIN leaf of the multiple matching sVIN leaf values falls between the expected minimum sVIN leaf value and the expected maximum sVIN leaf value, assigning a TIC value associated with the first sVIN leaf to the VIN;
  if more than one of the multiple matching sVIN leaf values fall between the expected minimum sVIN leaf value and the expected maximum sVIN leaf value, considering only sVIN leaf values that fall between a minimum sVIN leaf value and a maximum sVIN leaf value; and
  if more than one of the multiple matching sVIN leaf values fall between the minimum sVIN leaf value and the maximum sVIN leaf value, assigning TIC values associated with sVIN leaf values that fall between the minimum sVIN leaf value and the maximum sVIN leaf value.

18. A system, comprising:
  a first computer; and
  a second computer communicatively connected to the first computer over a network connection, wherein the first computer comprises a vehicle identification number decoder embodied on a non-transitory computer readable medium and configured to perform:
  partitioning a shortened vehicle identification number (sVIN) into a sVIN stem and a sVIN leaf;
  finding one or more matching sVIN leaf values from a set of look up tables utilizing the sVIN stem;
  assigning one or more trim identification code (TIC) values to the VIN depending upon a match outcome;
  constructing a candidate list utilizing the one or more TIC values, the candidate list containing one or more candidate trims for the VIN;
  generating a confidence score and a match probability for each of the one or more candidate trims; and
  based on the confidence score and the match probability generated for each of the one or more candidate trims, providing decoded information for the VIN to the second computer, the decoded information including trim data associated with at least one of the one or more candidate trims.

19. The system of claim 18, wherein the match outcome comprises a single matching sVIN leaf value, and wherein the vehicle identification number decoder is further configured to perform:
  if the single matching sVIN leaf value does not fall between an expected minimum sVIN leaf value and an expected maximum sVIN leaf value, assigning every distinct TIC value in a first lookup table that share the sVIN stem to the VIN; and
  if the single matching sVIN leaf value falls between the expected minimum sVIN leaf value and the expected maximum sVIN leaf value, assigning a TIC value associated with the sVIN leaf to the VIN.

20. The system of claim 18, wherein the match outcome comprises multiple matching sVIN leaf values, and wherein the vehicle identification number decoder is further configured to perform:
  if any one of the multiple matching sVIN leaf values does not fall between an expected minimum sVIN leaf value and an expected maximum sVIN leaf value, categorizing the match outcome as a model orphan;
  if only a first sVIN leaf of the multiple matching sVIN leaf values falls between the expected minimum sVIN leaf value and the expected maximum sVIN leaf value, assigning a TIC value associated with the first sVIN leaf to the VIN;
  if more than one of the multiple matching sVIN leaf values fall between the expected minimum sVIN leaf value and the expected maximum sVIN leaf value, considering only sVIN leaf values that fall between a minimum sVIN leaf value and a maximum sVIN leaf value; and if more than one of the multiple matching sVIN leaf values fall between the minimum sVIN leaf value and the maximum sVIN leaf value, assigning TIC values associated with sVIN leaf values that fall between the minimum sVIN leaf value and the maximum sVIN leaf value.

* * * * *